United States Patent [19]

Watanuki

[11] Patent Number: 5,211,042

[45] Date of Patent: May 18, 1993

[54] STEERING LOCKING APPARATUS WITH TILTABLE STEERING MECHANISM

[75] Inventor: Yoshio Watanuki, Kanagawa, Japan

[73] Assignee: Nissan Motor Co., Ltd., Yokohama, Japan

[21] Appl. No.: 857,562

[22] Filed: Mar. 25, 1992

[30] Foreign Application Priority Data

Mar. 29, 1991 [JP] Japan ................................. 3-66107
Nov. 25, 1991 [JP] Japan ................................ 3-308180

[51] Int. Cl.$^5$ ............................................. B60R 25/02
[52] U.S. Cl. ...................................... 70/252; 70/186; 74/493; 280/775
[58] Field of Search .................... 74/493; 70/184-186, 70/252-253; 280/775

[56] References Cited

U.S. PATENT DOCUMENTS

| 4,442,688 | 4/1984 | Saegusa ................................. 70/252 |
| 4,798,067 | 1/1989 | Peitsmeier et al. ..................... 70/252 |
| 5,090,730 | 2/1992 | DuRocher et al. ..................... 74/493 |

FOREIGN PATENT DOCUMENTS

63-43850  2/1988  Japan .................................. 70/252

Primary Examiner—Peter M. Cuomo
Assistant Examiner—Darnell Boucher
Attorney, Agent, or Firm—Lowe, Price, LeBlanc & Becker

[57] ABSTRACT

A vehicle steering locking system with a tiltable steering mechanism includes a column disposing a tiltable steering shaft therein, an ignition key cylinder in which an ignition switch is arranged having a key hole exposed to a passenger compartment at a preselected position, an operating rod arranged in the ignition key cylinder for activating the ignition switch in response to ignition key operation, a locking rod responsive to operation of the operating rod to selectively engage with and disengage from the steering shaft for locking and unlocking steering shaft operation, a locking rod housing, disposing the locking rod therein for connecting between the column and the ignition key cylinder. When the column is tilted together with the steering shaft, the locking rod housing rotates relative to the column to allow the ignition key cylinder to pivot with respect to the end portion of the ignition key cylinder having the key hole to maintain the key hole at the preselected position.

13 Claims, 9 Drawing Sheets

STEERING LOCKING APPARATUS WITH TILTABLE STEERING MECHANISM

BACKGROUND OF THE INVENTION

1. Field of The Invention

The present invention relates generally to a steering locking apparatus with a tiltable steering mechanism. More specifically, the invention relates to an improved steering locking apparatus structure with a tiltable steering mechanism.

2. Description of The Background Art

A steering locking apparatus is well known in the art for securing anti-theft characteristics in an automotive vehicle which is operable to restrict rotation of a steering shaft to inactivate steering operation after an ignition switch is turned off.

As such a steering locking apparatus, Japanese Patent First Publication No. 63-43850 discloses a typical arrangement including a locking rod which is releasably connected to a steering shaft and interlocks with on/off operation of an ignition switch. The locking rod is adapted to engage the steering shaft in response to turning off of the ignition switch.

In this arrangement, a steering column including the steering shaft therein and an ignition key cylinder are arranged parallel to each other through a rod housing. The rod housing accommodates the locking rod slidably therein which is biased by a spring to engage a locking groove formed in the steering shaft. A steering locking mechanism is provided on a top end portion of an operating rod of the ignition key cylinder. The steering locking mechanism includes a cam which is responsive to rotation of the operating rod causing the ignition switch to be turned on to shift the locking rod against a spring force for releasing the engagement with the locking groove of the steering shaft. An end portion of the ignition key cylinder in which a key hole is formed passes through an opening formed in an instrument panel to be exposed to a passenger compartment so as to be secured at a fixed position.

Accordingly, it will be noted that a steering system including a tiltable steering mechanism is required to keep a key hole at a fixed position by swinging an ignition key cylinder with respect to a portion passing through an instrument panel when a steering shaft is tilted. In the prior art system, for swinging the ignition key cylinder smoothly, an escutcheon made of rubber, or a flexible resin, is provided at an edge of the hole of the instrument panel for flexibly supporting the ignition key cylinder to allow it to move radially. Additionally, a universal joint is provided to connect between the ignition key cylinder and the rod housing for allowing swinging motion of the ignition key cylinder. Thus, the prior art system requires a great number of parts resulting in a complex structure and high manufacturing costs.

SUMMARY OF THE INVENTION

It is therefore a principal object of the present invention to avoid the disadvantages of the prior art.

It is another object of the invention to provide a steering locking apparatus with a tiltable steering mechanism for an automotive vehicle which has a simple structure for allowing an ignition key cylinder to pivot according to tilting a steering shaft to secure an ignition key hole formed in an end of the ignition key cylinder at a fixed position.

According to one aspect of the present invention, there is provided a vehicle steering locking apparatus comprising: a column disposing a steering shaft therein, the column being tiltable together with the steering shaft; an ignition key cylinder in which an ignition switch is arranged, an end portion of the ignition key cylinder having a key hole exposed to a passenger compartment at a preselected position; an operating rod arranged in the ignition key cylinder for activating the ignition switch in response to ignition key operation; a locking rod responsive to operation of the operating rod to selectively engage with and disengage from the steering shaft for locking and unlocking steering shaft operation; a locking rod housing, disposing the locking rod therein, connecting between the column and the ignition key cylinder; and means for allowing the locking rod housing to rotate relative to the column according to tilting motion of the column to allow the ignition key cylinder to pivot on the end portion of the ignition key cylinder having the key hole while maintaining the end portion at the preselected position.

DESCRIPTION OF THE PREFERRED EMBODIMENT

Figure 1:
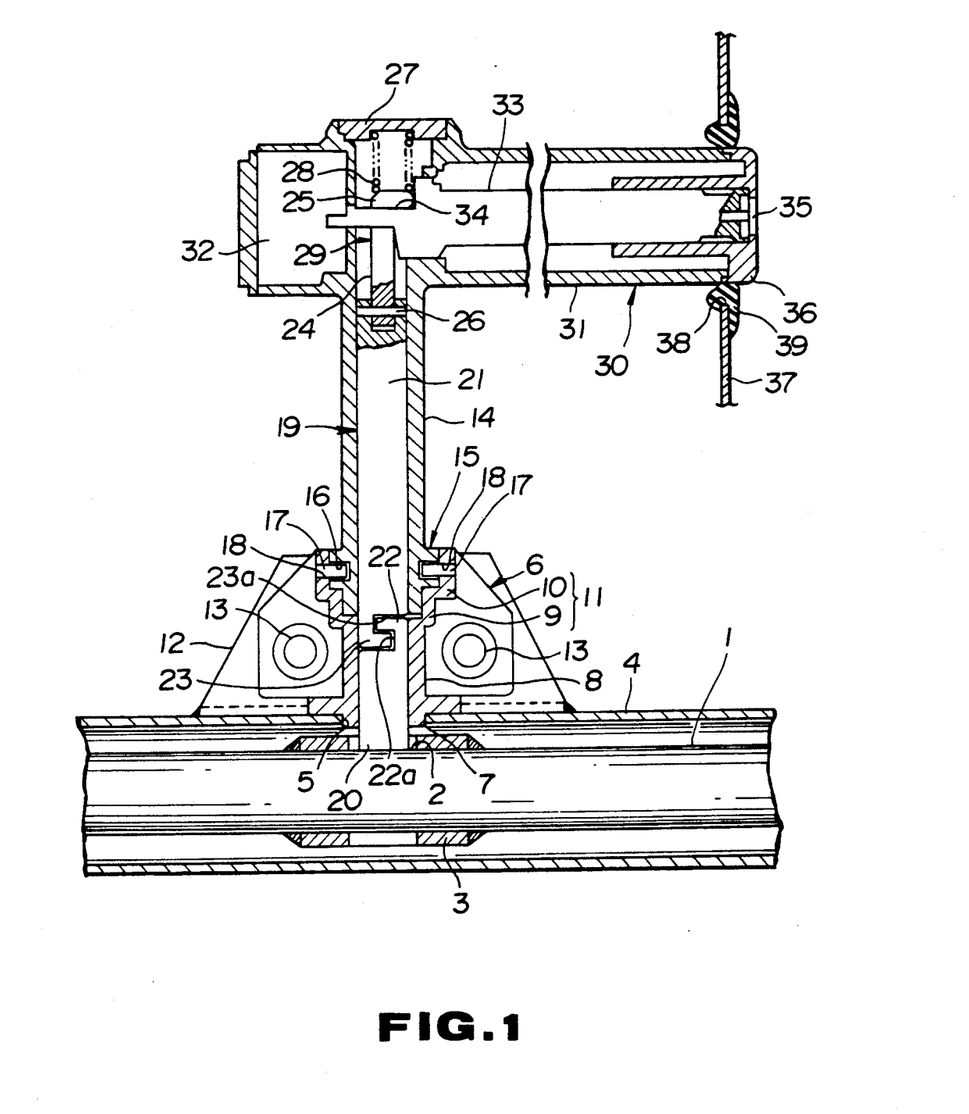
FIG. 1 is a cross-sectional view which shows a steering locking system with a tiltable steering mechanism according to the present invention.

Referring now to the drawings, particularly to FIG. 1, a steering lock system according to the present invention is shown. This system generally includes a tiltable steering shaft 1 on which a steering wheel (not shown) is mounted, a column tube 4 supporting the steering shaft therein rotatably, a locking rod 19, and a rod housing 14, a frame 6 as a supporting member bearing the rod housing 14 on the column tube 4, and an ignition key cylinder 30 having an ignition key cylinder housing 31. The column tube 4 is supported by a portion of a vehicle body to tilt together with the steering shaft 1.

The tiltable steering shaft 1 has a collar 3 welded thereon which includes a recessed locking portion 2 for locking rotation of the steering shaft 1. The column tube 4 includes a mounting hole 5 which is opposed to the recessed locking portion 2. The frame 6 is placed on the column tube 4 engaging a boss 7 with the mounting hole 5 and fixed on a bracket 12 by bolts 13. The bracket 12 is welded on the column tube 4 for supporting the rod housing 14 and the locking rod 19. The frame 6 includes a small diameter section 8, an intermediate diameter section 9, and a large diameter section 10 in a stepwise fashion which are arranged coaxially with the boss 7. The small diameter section 8 has a through hole 6A to retain the locking rod 19 slidably therein. The intermediate diameter section 9 and the large diameter section 10 form a socket portion 11 above the small diameter section 8 to receive an end portion of the rod housing 14.

Figure 2:
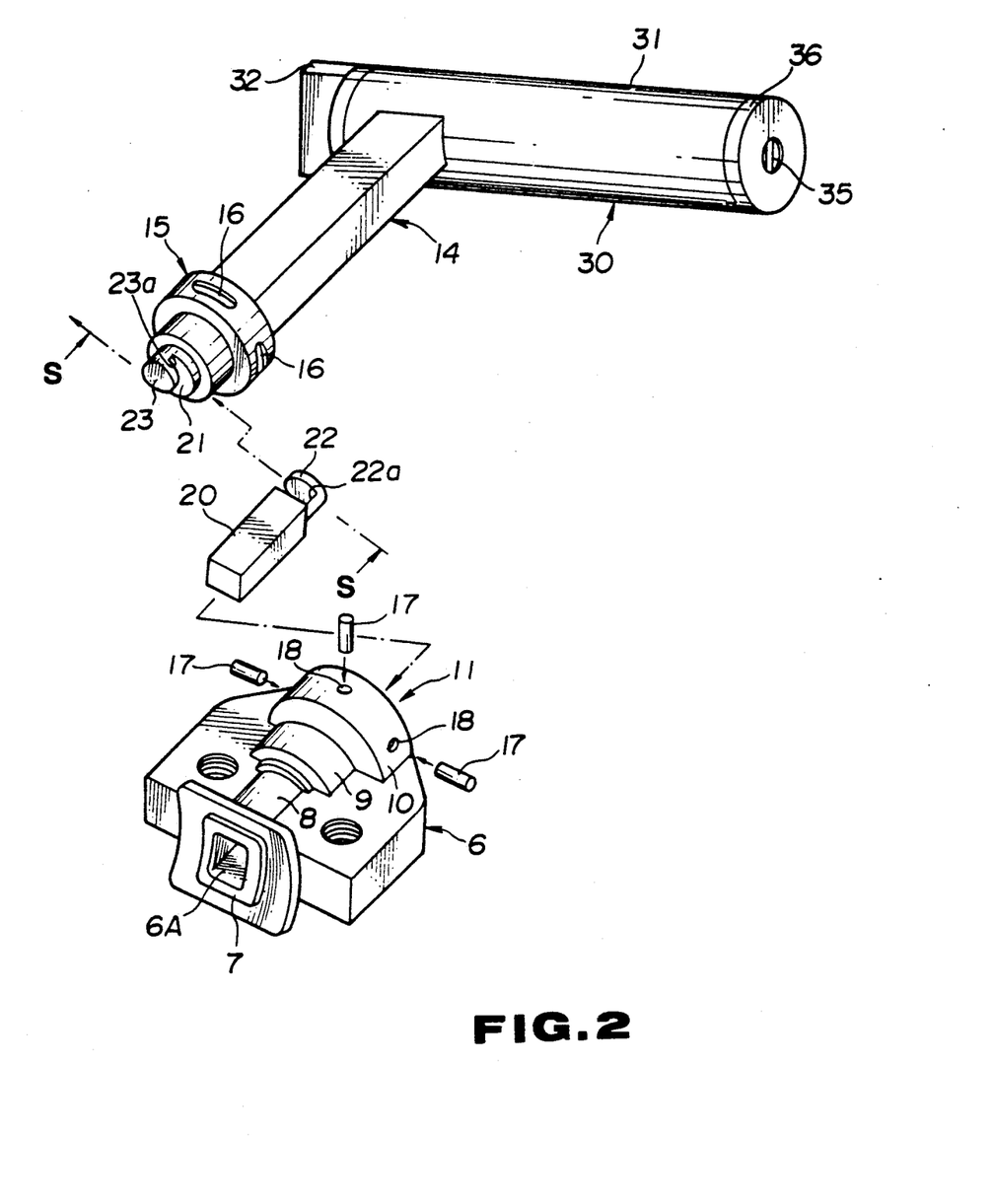
FIG. 2 is an exploded perspective view which shows a rod housing and a frame of a steering locking system.

The rod housing 14 is, as shown in FIG. 2, made of a hollow square member and formed integrally with the ignition key cylinder housing 31 extending perpendicularly to the housing 31. On an end portion of the rod housing 14, a plug portion 15 is formed which includes small and large diameter sections in a stepwise fashion which slidably engage with the socket portion 11 of the frame 6. The large diameter section of the plug portion 15 is comprised of a disk having a plurality of circumferentially elongated recessed portions, or grooves 16 in its outer surface. The large diameter section 10 of the socket portion 11 has a plurality of holes 18 in its circumferential surface for receiving staking pins 17. The staking pins 17 are such that they are inserted into the holes 18 completely after the plug portion 15 of the rod housing 14 is inserted into the socket portion 11 so that inwardly projected portions of the staking pins 17, as shown in FIG. 1, engage with the grooves 16 for allowing the rod housing 14 to rotate in a circumferential direction thereof relative to the column tube 4 within a range defined by the lengths of the grooves 16.

Figure 3:
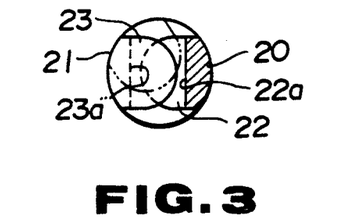
FIG. 3 is a cross-sectional view taken along the line S—S in FIG. 2.

The locking rod 19 is made of a square member and is disposed in the rod housing 14 slidably in a longitudinal direction. The locking rod 19 includes first and second rods 20 and 21 separate from each other. The first rod 20 is retained in the small diameter section 8 of the frame 6 and an end portion thereof is selectively engageable with the recessed locking portion 2. The second rod 21 is connected to an operating rod 33 of the ignition key cylinder 30. The first and second rods 20 and 21 are connected to each other by engaging substantially L-shaped connecting end portions, or circular hook portions 22 and 23. These hook portions 22 and 23, as shown in FIG. 2, include grooves 22a and 23a respectively. When the steering shaft is tilted, the hook portions 22 and 23, as shown in FIG. 3, rotate relative to each other circumferentially within a preselected limited range while the grooves 22a and 23a are engaged with each other.

Connected to an end of the second rod 21 by a pin 26 is a hanger 24 which includes a hook 25 on its end. Between the hook 25 and an end cap 27 of the rod housing 14, a spring 28 is disposed to bias the locking rod 19 in a longitudinal direction so that the end portion of the locking rod (i.e., the lower end of the first rod 22) engages the recessed locking portion 2.

Disposed in an end portion of the ignition key cylinder housing 31 is an ignition switch 32 which is actuated by the operating rod 33 in response to manual ignition key operation by a driver. An end portion of the operating rod 33 is cut out to form a flat cam 34 selectively engageable with the hook 25. The operating rod 33 is selectively connected to the locking rod 19 through the engagement of the cam 34 with the hook 25 for constituting a locking release mechanism 29. At an ignition key OFF-position, or when a driver turns an ignition key (not shown) inserted into a key hole 35 formed in an end of the ignition key cylinder 30 to rotate the operating rod 33 for turning off the ignition switch 32 to stop an engine, the flat surfaces of the cam 34 and the hook 25 are opposed to each other so that the operating rod 33 disengages from the locking rod 19 to establish a steering locking position where a spring force of the spring 28 urges the end of the locking rod 19 to be inserted into the recessed locking portion 2 of the collar 3 for locking steering shaft operation. Alternatively, when the operating rod 33 is rotated to turn on the ignition switch 32, the flat surface of the cam 34 engages the hook 25 to shift the hanger 24 together with the locking rod 19 toward the end cap 27 against the spring force of the spring 28, releasing the engagement of the end of the locking rod 19 with the recessed locking portion 2. This results in a released steering locking status.

The ignition key cylinder 30 is, as shown in FIG. 1, arranged parallel to the column tube 4 via the rod housing 14 through the connection between the first and second rods 20 and 21 wherein the plug portion 15 of the rod housing 14 engages the socket portion 11 of the frame 6 with the staking pins 17 being inserted therethrough. A position cap 36 including the key hole 35 in its central portion is provided on an end of the ignition key cylinder housing 31. The position cap 36 is secured in a mounting hole 38 formed in an instrument panel 37 by an escutcheon 39 in a conventional manner to be exposed to a passenger compartment at a preselected position. The escutcheon 39 is made of an elastic material for allowing the position cap 36 to move in a radial direction slightly.

Figure 4:
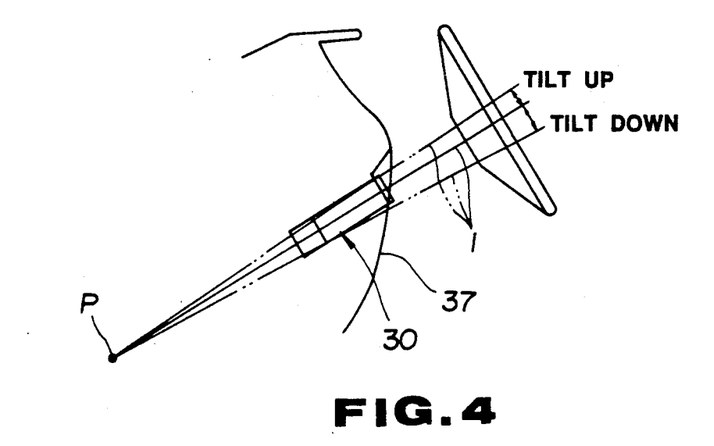
FIG. 4 is a schematic view which shows arrangement of a steering locking system of the present invention.
Figure 5:
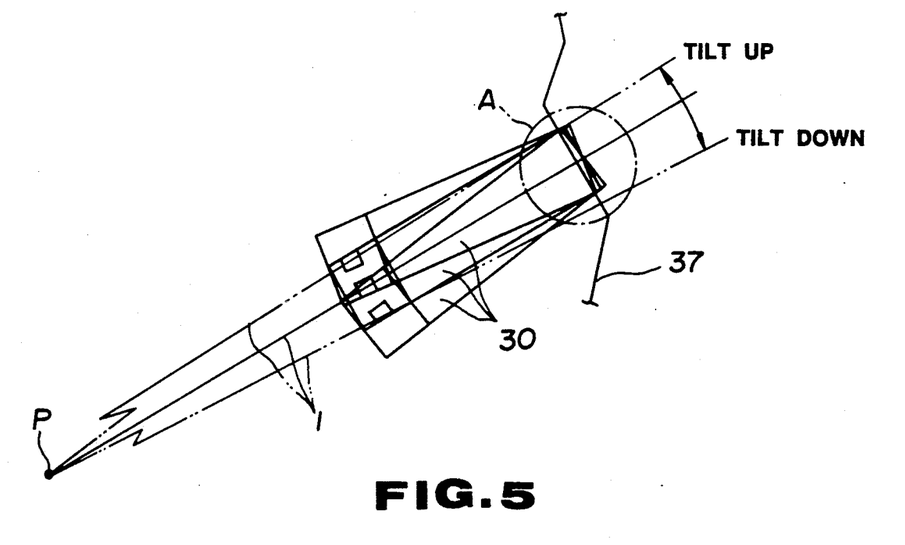
FIG. 5 is an enlarged view of FIG. 4.
Figure 6:
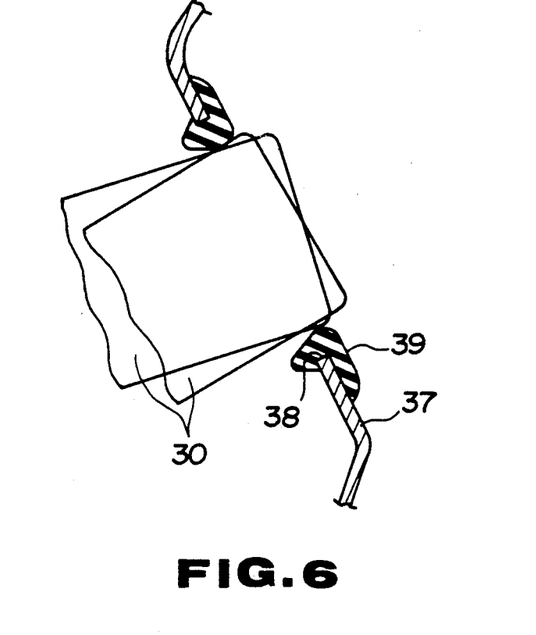
FIG. 6 is an enlarged view of a circle A in FIG. 5.

In operation, when the steering shaft 1 is, as shown in FIG. 4, tilted to a position of interest to a driver with respect to the tilting center P within the up and down tilt range limits, the rod housing 14 and the locking rod 19 are twisted since the position cap 36 on the end of the ignition key cylinder 30 is retained in the mounting hole 38 of the instrument panel 37. The rod housing 14 however rotates at the connection between the plug portion 15 and the socket portion 11 of the frame 6 within the range defined by the lengths of the grooves 16 with which the staking pins 17 engage, the locking rod 19 also rotates wherein the first and second rods 20 and 21 rotate relative to each other while the hook portions 22 and 23 are engaged with each other. This results in the torsion created at the rod housing 14 and the locking rod 19 being absorbed. Thus, the ignition key cylinder 30, as shown in FIGS. 5 and 6, pivots on the end portion thereof passing through the mounting hole 38 of the instrument panel 37 so that the key hole 35 is maintained at a preselected position in a passenger compartment.

Figure 7:
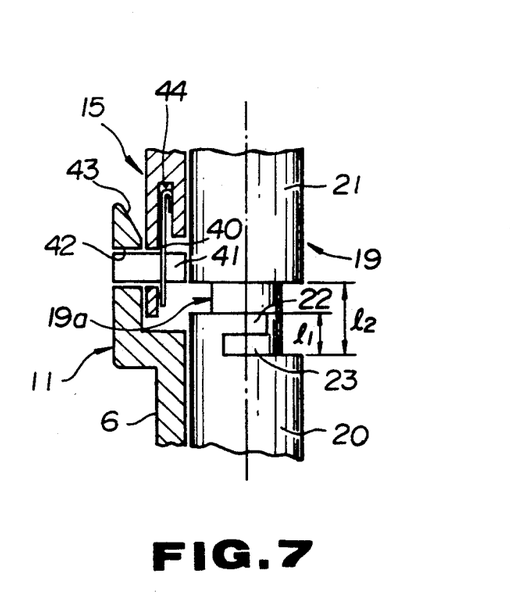
FIG. 7 is a partially sectional view which shows a connection between a plug and socket portions of a locking rod.
Figure 8:
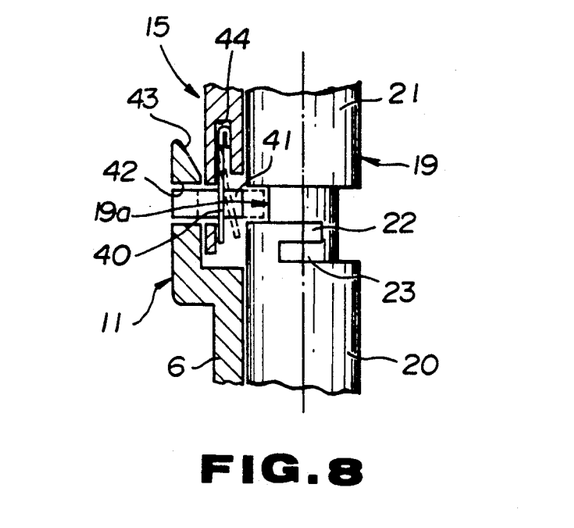
FIG. 8 is a partially sectional view which shows assembling and disassembling operations of a plug and socket portions of a locking rod.

Referring to FIGS. 7 and 8, a second embodiment is shown which is a modification of the connecting structure of the socket portion 11 and the plug portion 15 as shown in the first embodiment. The plug portion 15 includes a plurality of locking pins 41 which are arranged circumferentially with regular intervals projecting outwardly through holes formed in an end portion of the plug 15. The locking pins 41 are supported by leaf springs 40. Ends of the leaf springs 40 are folded and are fitted into a groove 44 respectively which is formed in an end surface of the plug 15. The socket portion 11 includes a plurality of holes 42 elongated circumferentially for receiving the locking pins 41 respectively and a tapered surface 43 formed by chamfering an inner peripheral edge. A locking rod 19, similar to the above first embodiment, includes first and second rods 20 and 21. The first rod 20 includes a hook portion 22 at its end having a length $l_1$. The second rod 21 includes a hook portion 23 at its end opposing the first rod which has a length $l_2$ greater than $l_1$ by a preselected value slightly greater than a diameter of the locking pins 41. Therefore, a recessed portion, or groove 19a is defined between an top end surface of the hook 22 and a shoulder portion of the second rod 21 for allowing the locking pins 41, as shown in FIG. 8, to enter thereinto against spring forces of the leaf springs 40.

FIG. 7 shows a state wherein the locking rod 19 is displaced downward, as viewed in the drawing, to insert an end portion thereof into the recessed locking portion 2 to prevent the steering shaft 1 from rotating, the groove 19a is offset from the locking pins 41.

FIG. 8 shows a state where the locking rod 19a is shifted upwardly against the spring force of the spring 28 for releasing the locked state of the steering shaft 1, the groove 19a coincides with the locking pins 41.

In connecting the plug portion 15 to the socket portion 11, insertion of the plug portion 15 into the socket portion 11 with the locking rod 19 being shifted upwardly to release the locked status of the steering shaft 1 causes outer ends of the locking pins 41 to be pushed inwardly along the tapered surface 43 against the spring forces of the leaf springs 40, thereby inserting inner ends of the locking pins 41 into the groove 19a. Upon passing over the tapered surface 43, the locking pins are then inserted into the elongated holes 42 forcibly by reaction forces of the leaf spring 40 engaging the plug portion 15 with the socket portion 11.

It will be appreciated that the connecting operation of the plug portion 15 and the socket portion 14 is easily effected. Additionally, when removing a rod housing 14 from a column tube 4 for repair for example, the locking pins 41 are pushed inwardly to be inserted into the groove 19a against the spring forces of the leaf springs 40 until the the outer ends of the locking pins 41 enter into the inside of the socket portion 11 completely as shown by a broken line in FIG. 8. From this condition, withdrawal of the plug portion 15 upwardly releases the connection between the plug portion 15 and the socket portion 11 easily.

As described above, when the locking rod 19 is shifted downwardly to engage the recessed locking portion 2 for locking the steering shaft 1, the locking pins 41 is, as shown in FIG. 7, offset from the groove 19a and thus the locking pins 41 are prevented from being pushed inwardly, preventing the rod housing 14 from being dislodged from the column tube 4.

Figure 9:
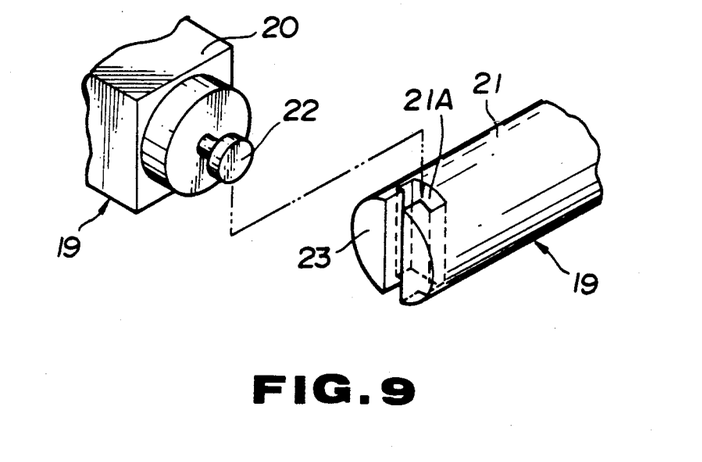
FIG. 9 is an exploded perspective view which shows an alternative embodiment of a connection between a plug and socket portions of a locking rod.
Figure 10:
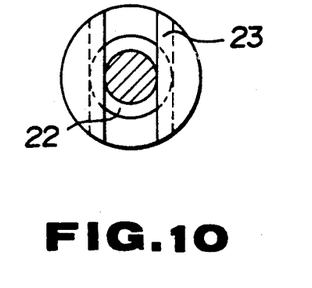
FIG. 10 is a cross-sectional view which shows the plug and socket connection of FIG. 9.

Referring to FIGS. 9 and 10, a third embodiment is shown which is a modification of the connecting structure of the first and second rods 20 and 21 of the locking rod 19. The first rod 20 has a hook portion 22 at its end. This hook portion 22 is provided with a stud which includes a large disc and a small disc which are attached to each other through a shaft with a given interval therebetween. The second rod 21 has an engaging portion 23 which includes a groove 21A, T-shaped in cross section, contoured for receiving the hook portion 22. Accordingly, torsion of the locking rod 19 caused by tilting the steering shaft 1 is absorbed by relative rotation of the first and second rods 20 and 21 wherein the stud 22 rotates in the groove 21A.

Figure 11:
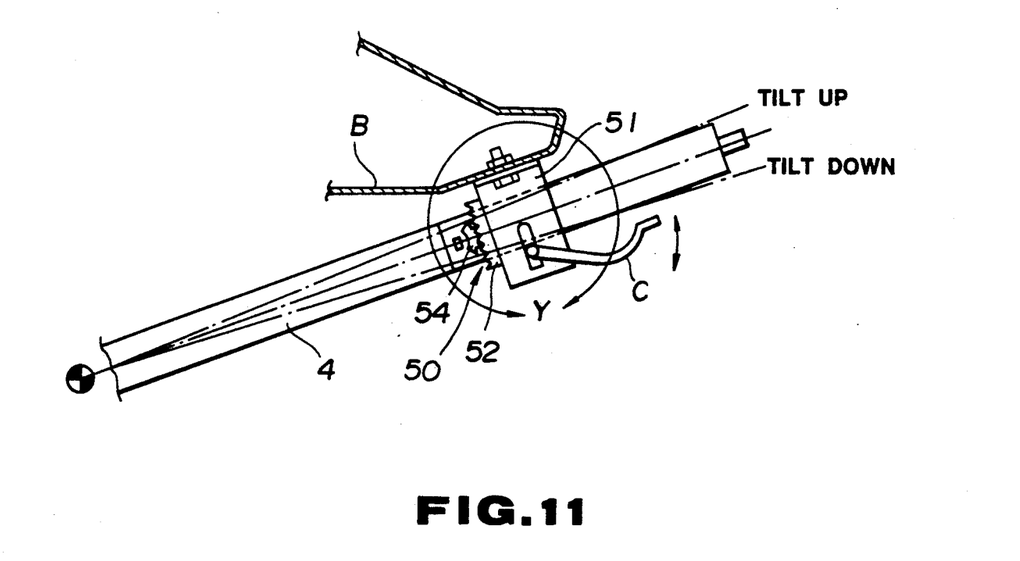
FIG. 11 is a schematic view which shows an alternative embodiment according to the present invention.

Referring to FIG. 11, a fourth embodiment is shown which is a modification of the first embodiment. This embodiment comprises a locking mechanism 50 which includes a rack 52 and a pinion 54 meshing with the former. The rack 52 is welded to a column bracket 51 attached to a portion B of a vehicle body. A tilt lever C is provided for manually tilting up and down a column 4 by swinging in a direction shown by an arrow. The locking mechanism 50 serves to allow a rod housing 14 to rotate when the column 4 is tilted, but prevents the rod housing 14 from rotating independently of the column when external force acts thereon.

Figure 12:
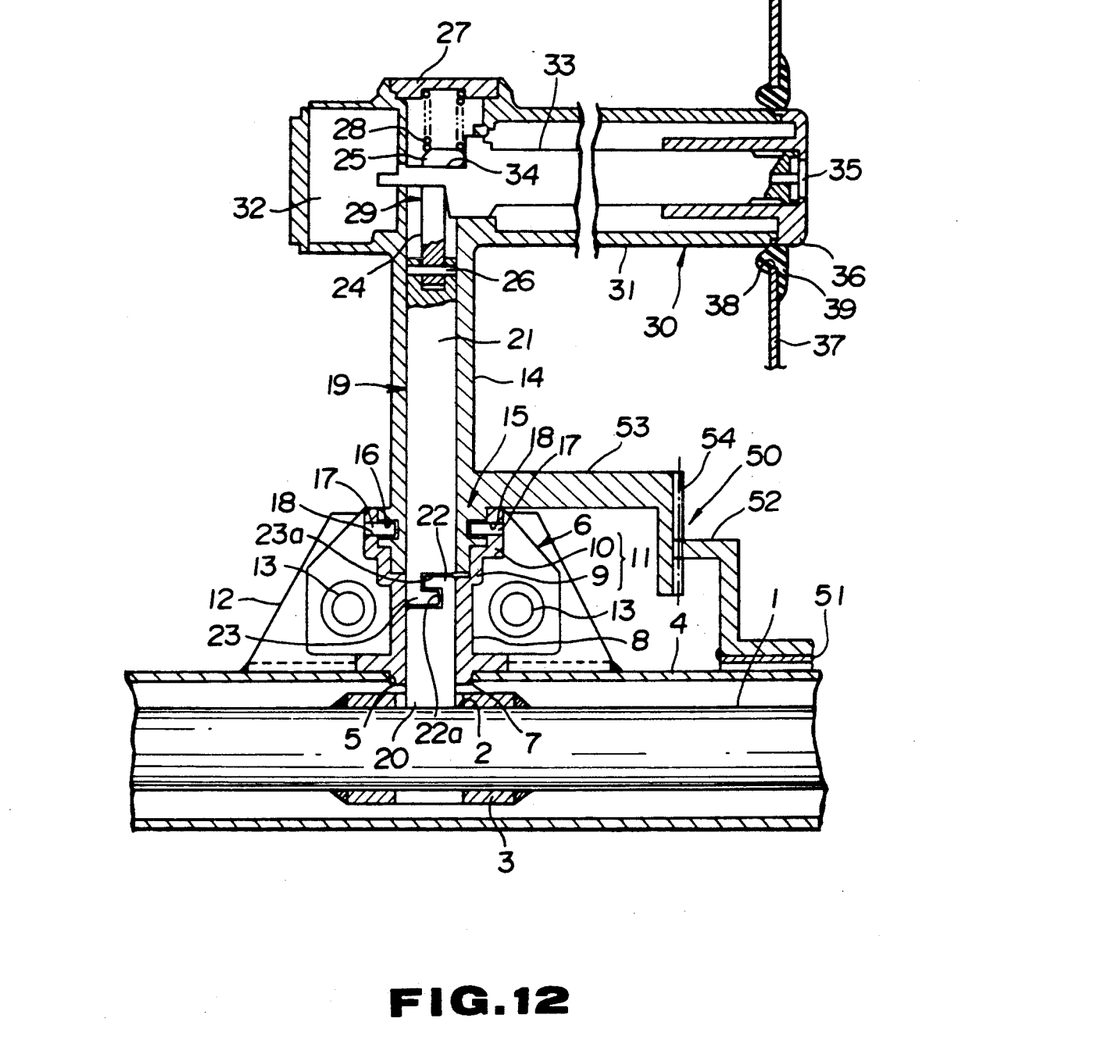
FIG. 12 is a cross-sectional view of the steering locking system of FIG. 11.
Figure 13:
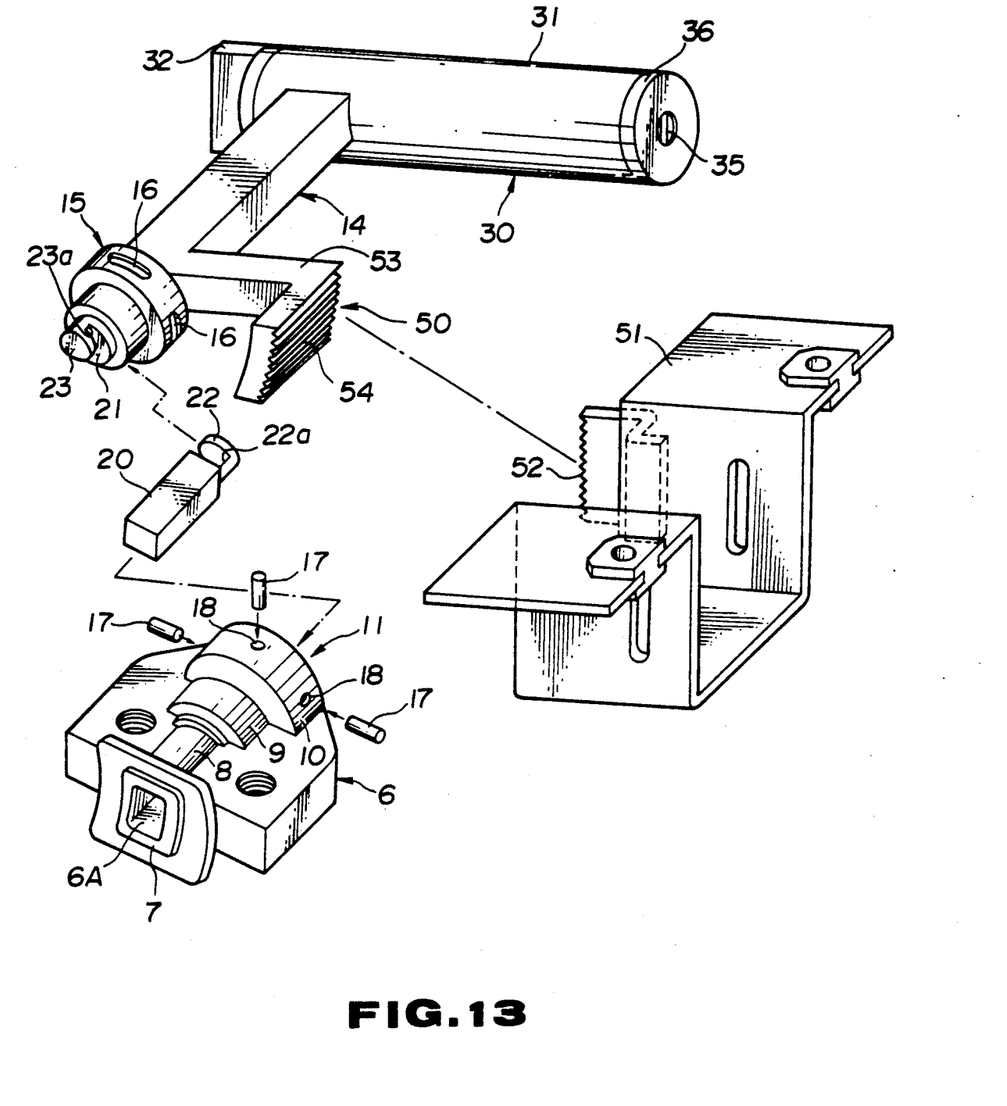
FIG. 13 is an exploded perspective view which shows a rotation locking mechanism of the steering locking system.

Referring to FIGS. 12 and 13, the structure of the locking mechanism 50 is shown. Like numerals refer to like parts of the above mentioned first embodiment and thus explanation thereof in detail will be omitted here. The rod housing 14 includes an integrally formed extending portion, or L-shaped arm member 53 which projects perpendicularly to the rod housing 14. The pinion 54 is formed on an end of the arm member 53. The rack 52 is attached to a side surface of the column bracket 51.

Figure 14:
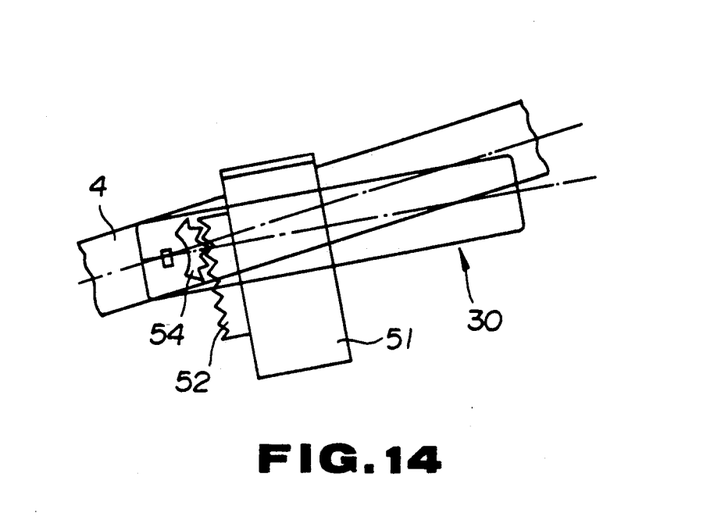
FIG. 14 is an enlarged view of a circle Y in FIG. 11 which shows a steering column tilted up.
Figure 15:
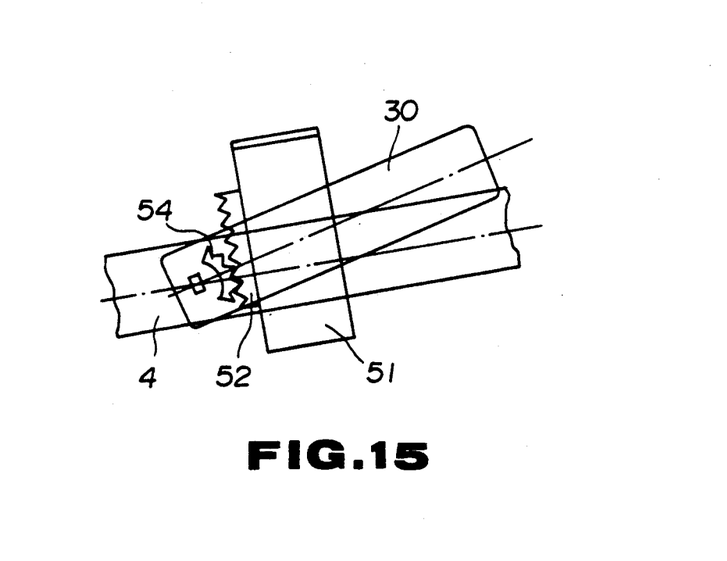
FIG. 15 is an enlarged view of a circle Y in FIG. 11 which shows a steering column tilted down.

In operation, when the column 4 is, as shown in FIG. 14, tilted up, or, as shown in FIG. 15, tilted down, due to engagement of the pinion 54 with the rack 52, the rod housing 14 rotates at a connection between a plug portion 15 and a socket portion 11 of a frame 6 within a range defined by lengths of circumferentially elongated grooves 16 into which staking pins 17 are inserted. The locking rod 19 is twisted wherein first and second rods 20 and 21 rotate relative to each other at engaged sections of hooks 22 and 23 thereof for absorbing the torsion of the rod housing 14 and the locking rod 19. This allows an ignition key cylinder 30 to swing with respect to an end portion passing through a mounting hole 38 of an instrument panel 37.

Even when external force acts on the rod housing 14 to create rotational force while the steering shaft 1 and the column 4 are fixed at a preselected tilt angle, the rotational force is imposed on the part of the vehicle body B since the engagement between the pinion 54 and the rack 52 prevents the rod housing 14 from rotating. Therefore, even if the end of the ignition key cylinder 30 is dislodged from the mounting hole 38 and a certain external force acts on the ignition key cylinder 30 in a rotational direction of the rod housing 14, this force is absorbed by rotation of the plug portion 15 relative to the socket portion 11 according to movement of the staking pins 17 within the elongated grooves 16, preventing the connection between the plug portion 15 and the socket portion 11 from being broken. This results in greatly enhanced anti-theft characteristics.

As mentioned previously, the locking rod 19 includes the separate two rods: the first and second rods 20 and 21. The cross-sectional shapes of the second rod 20 and the hole 6A of the frame 6 are square. However, the locking rod 19 may take the form of a circle entirely and the cross-sectional shape of the hole 6A may also be circular. With these arrangements, the connecting portions 22 and 33, as mentioned above, can be omitted since tilting the steering shaft 1 causes the locking rod 19 to rotate relative the steering shaft 1 wherein an top end portion of the locking rod 19 rotates within the recessed locking portion 2. However, it will be appreciated that the square second rod 20 and the hole 6A are preferable to the circular locking rod 19 and the hole 6A for the following reasons. If torsion is exerted to the frame 6 from the column 4, it is received by a surface or a contact area between an outer surface of the locking rod 19 and an inner wall of the hole 6A. In the case of the circular locking rod 19 and the hole 6A, the torsion is received by a line of contact between the locking rod 19 and the hole 6A.

What is claimed is:

1. A vehicle steering locking apparatus comprising:
   a column disposing a steering shaft therein, said column being tiltable together with the steering shaft;
   an ignition key cylinder in which an ignition switch is arranged, an end portion of said ignition key cylinder having a key hole exposed to a passenger compartment at a preselected position;
   an operating rod arranged in said ignition key cylinder for activating the ignition switch in response to ignition key operation;
   a locking rod responsive to operation of said operating rod to selectively engage with and disengage from the steering shaft for locking and unlocking steering shaft operation;
   a locking rod housing, disposing said locking rod therein, connecting between said column and said ignition key cylinder; and
   means for allowing said locking rod housing to rotate relative to said column according to tilting motion of said column to allow said ignition key cylinder to pivot on the end portion of said ignition key cylinder having the key hole while maintaining said end portion at said preselected position.

2. An apparatus as set forth in claim 1, wherein said ignition key cylinder is arranged parallel to said column through said locking rod housing.

3. An apparatus as set forth in claim 1, wherein said means includes a supporting member connecting between said column and said locking rod housing, said supporting member including a socket portion for rotatably receiving an end portion of said locking rod housing.

4. An apparatus as set forth in claim 3, wherein said locking rod housing includes a disk at the end portion received in the socket portion of said supporting member, the end portion of said locking rod housing having a plurality of circumferentially elongated grooves in a peripheral surface thereof, the socket portion of said supporting member including a plurality of holes into which pins are inserted to engage the elongated grooves of the disk respectively for allowing the disk to rotate in the socket portion within a range defined by the lengths of the elongated grooves.

5. An apparatus as set forth in claim 3, wherein said locking rod housing includes a plurality of pins at the end portion received in the socket portion of said supporting member which are projected outwardly, the socket portion including a plurality of circumferentially elongated openings for receiving the pins of said locking rod housing for allowing said locking rod housing to rotate relative to the socket portion within a range defined by the lengths of the elongated openings.

6. An apparatus as set forth in claim 1, wherein said locking rod includes first and second rods which include hook portions at ends thereof respectively, the hook portions engaging with each other so as to allow the first and second rods to rotate relative to each other in a given limited range.

7. An apparatus as set forth in claim 4, wherein said locking rod includes first and second rods which include hook portions at ends thereof respectively, the first rod being disposed in the supporting member, the second rod being disposed in the locking rod housing, the hook portions engaging with each other so as to allow the first and second rods to rotate relative to each other in a given limited range.

8. An apparatus as set forth in claim 5, wherein said locking rod includes first and second rods which include hook portions at ends thereof respectively, the first rod being disposed in the supporting member, the second rod being disposed in the locking rod housing, the hook portions engaging with each other so as to allow the first and second rods to rotate relative to each other in a given limited range.

9. An apparatus as set forth in claim 6, wherein the first and second rods are made of square members, the first rod being disposed in said supporting member, the second rod being disposed in said locking rod housing.

10. An apparatus as set forth in claim 1, wherein said locking rod includes first and second rods, the first rod including a stud at its end, the second rod including a groove in its end which receives the stud of the first rod so as to allow the stud to rotate in the groove.

11. An apparatus as set forth in claim 5, wherein said locking rod includes first and second rods which include first and second hook portions at ends thereof respectively, the locking rod housing supporting the pins through a spring so that the pins enter into the elongated openings of said supporting member, the first and second hooks being engaged with each other to define a recessed portion in the connection therebetween for receiving the pins when the pins are pushed inside the locking rod housing.

12. An apparatus as set forth in claim 1, further comprising a locking mechanism which serves to allow said rod housing to rotate relative to the column according to the tilting motion of the column and restricts said rod housing from rotating independently of the tilting motion of the column.

13. An apparatus as set forth in claim 12, wherein said locking mechanism includes a rack and a pinion meshing with the rack, the rack being attached to a portion of a vehicle body, the pinion being attached to said locking rod housing.

* * * * *